July 7, 1953

G. C. PAXTON 2,644,579

CULL CHECKING SYSTEM FOR MULTIPLE
STATION GRADING OR PACKING STANDS

Filed Dec. 31, 1948

INVENTOR
G. C. Paxton

BY

ATTORNEYS

July 7, 1953

G. C. PAXTON 2,644,579

CULL CHECKING SYSTEM FOR MULTIPLE
STATION GRADING OR PACKING STANDS

Filed Dec. 31, 1948

INVENTOR
G. C. Paxton
BY
ATTORNEYS

Patented July 7, 1953

2,644,579

UNITED STATES PATENT OFFICE 2,644,579

CULL CHECKING SYSTEM FOR MULTIPLE STATION GRADING OR PACKING STANDS

Gerald C. Paxton, Sanger, Calif., assignor to General Nailing Machine Corporation, Sanger, Calif., a corporation of California Application December 31, 1948, Serial No. 68,704

18 Claims. (Cl. 209—125)

This invention relates in general to equipment for use in connection with fruit or vegetable grading or packing operations.

In particular the invention has for one object the provision of a novel, cull checking system for a fruit or vegetable grading or packing stand; such system being arranged to permit an inspector to readily and easily determine if workers are using care and rejecting only culls from the fruit or vegetables being manually graded or packed at the stand.

The invention has for another object the provision of a system, as above, which is especially useful in connection with a packing stand of multiple station type including a common, cull carry-off conveyor; the system contemplating the marking of the cull carry-off conveyor with spaced indicia corresponding to each station, and a cull hopper adjacent each station which is automatically dumped onto the conveyor when the corresponding indicium approaches. In this way an inspector can ascertain exactly what each worker is rejecting as culls.

A further object of the invention is to provide a cull checking system, as in the preceding paragraph, wherein the dumping of each hopper is controlled, in proper timed relation to the cull carry-off conveyor, by mechanism actuated by the conveyor drive; such mechanism including a simple but effective clutch unit.

A further object of the invention is to provide a practical and reliable cull checking system for grading or packing stands, and one which will be exceedingly effective for the purpose for which it is designed.

These objects are accomplished by means of such structure and relative arrangement of parts as will fully appear by a perusal of the following specification and claims.

In the drawings:

Fig. 5 is an enlarged fragmentary sectional plan view of the novel clutch unit which the gate-actuated mechanism embodies; such clutch unit being shown in its inactive position corresponding to Fig. 3.

Fig. 6 is a similar view, but shows the clutch in its active or engaged position corresponding to Fig. 4.

Referring now more particularly to the characters of reference on the drawings, the novel cull checking system is here illustrated as embodied in connection with an elongated, multiple station, fruit or vegetable grading or packing stand, indicated generally at 1; each station of said stand being indicated at 2.

Figure 2:
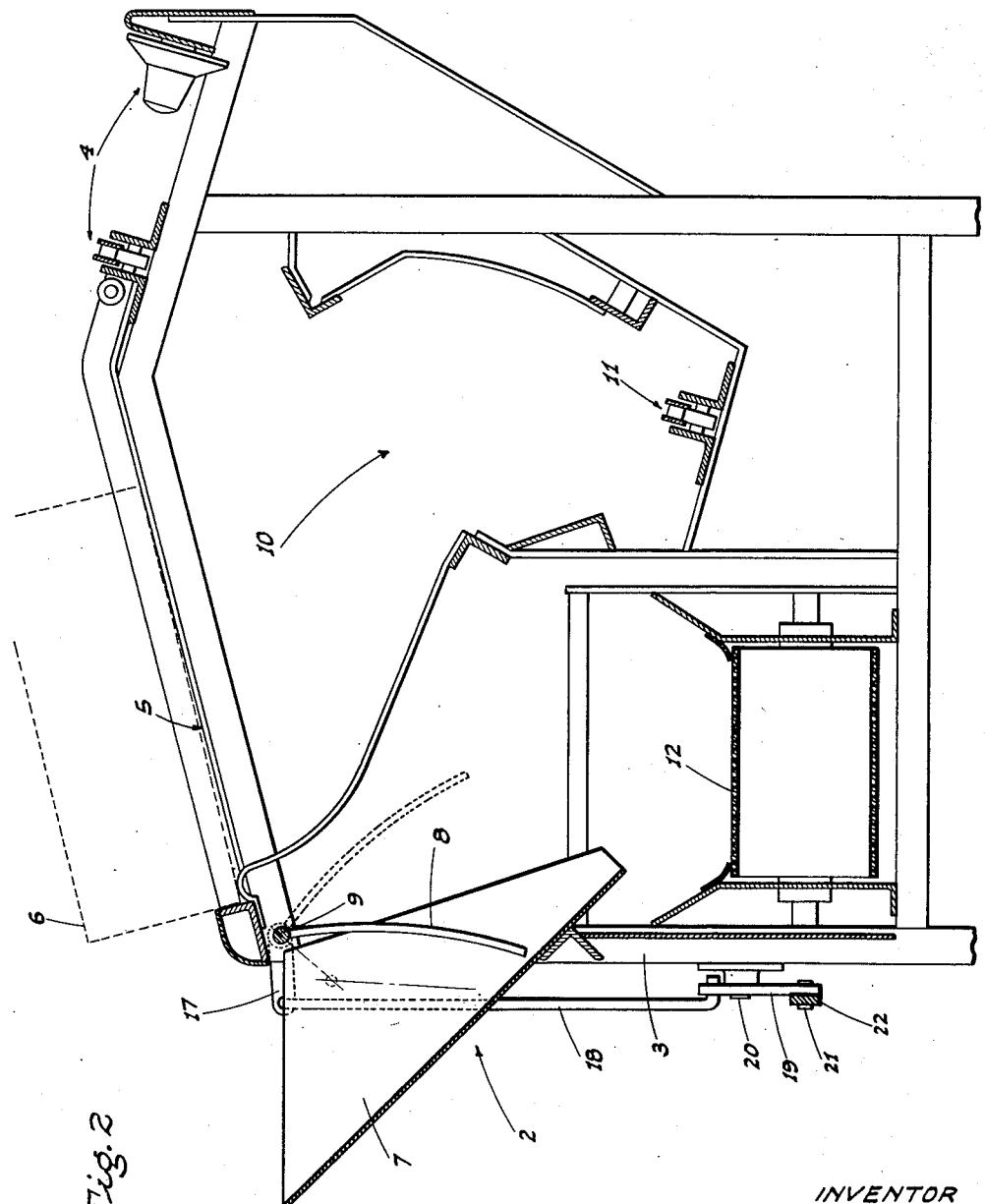
Fig. 2 is an enlarged cross section on line 2—2 of Fig. 1; such cross section being taken directly through one of the stations of the stand.

The stand 1 includes an upstanding, elongated supporting frame 3, and as the structure of the stand is substantially the same at each station, a description of one station, as shown particularly in Fig. 2, will suffice for all.

A loaded box conveyor 4 extends along the top of the stand 1 at the back thereof, and a box support 5 extends forwardly and downwardly at each station in front of the loaded box conveyor 4, whereby the worker at such station may manually pull a box 6 from the conveyor 4 forwardly onto the support 5 for manually removing the fruit or vegetables from such box for the purpose of grading or packing the same.

The fruit or vegetables so graded or packed are placed into other boxes or onto a conveyor (not shown), the culls being dropped into a hopper 7 at the front of each station; each such hopper 7 including a normally closed gate 8 which is suspended from a transverse rock shaft 9. The operation of this gate 8 by the rock shaft 9 will appear in detail hereinafter.

Each box 6, when empty, is released from the support 5 and discharged downwardly through a box chute 10 onto a box carry-off conveyor 11 which extends lengthwise in the frame 3 adjacent the back and lower portion thereof.

Ahead of the box carry-off conveyor 11 the stand includes, within the frame 3, a horizontal, longitudinally extending cull conveyor 12 which is of endless flat belt type; the mounting of the conveyor 12 being such that it is common to each of the stations 2, and disposed for reception of the culls from each hopper 7 upon opening of the corresponding gate 8.

At the lead end of such conveyor 12 it is driven from a motor 13 by means of a suitable drive, here an endless chain and sprocket unit 14.

Figure 1:
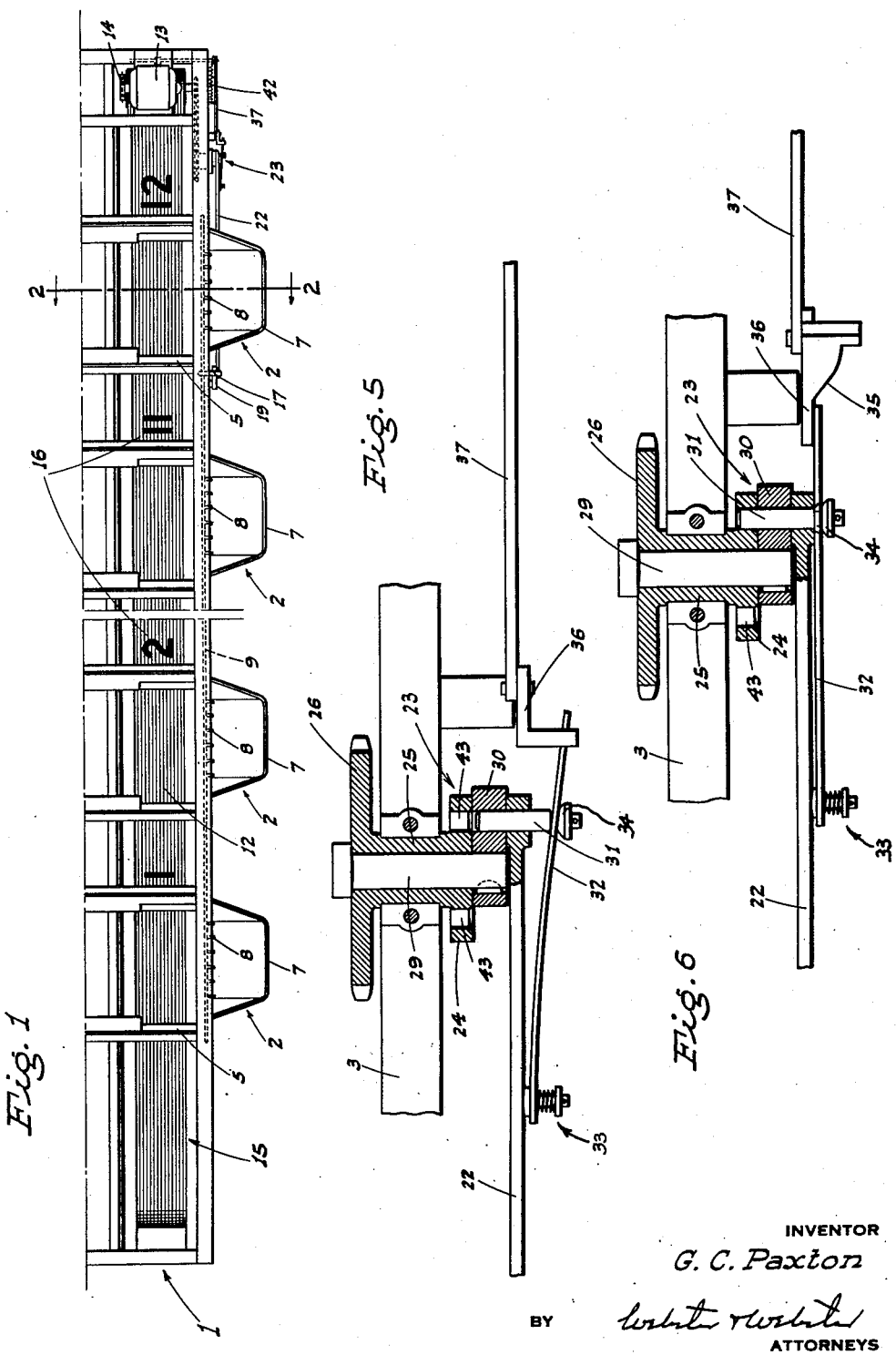
Fig. 1 is a fragmentary plan view, foreshortened, of a multiple station grading or packing stand embodying the novel cull checking system.

At the opposite or discharge end portion of the conveyor 12 the upper run thereof is exposed for some distance beyond the last station 2, in order to provide an inspection zone, indicated at 15 in Fig. 1. An inspector within view of this zone observes the culls being fed from the stand.

The conveyor 12 is marked, on the outside face thereof, with a plurality of longitudinally spaced indicia 16, such as numerals, corresponding to, and spaced apart the same distance as, the stations 2. It will thus be recognized that upon travel of the conveyor 12, the indicia 16 approach corresponding stations 2 at the same moment, and at this moment the hopper gates 8 are automatically opened, dumping the hoppers 7 onto the conveyor 12. The result is that the hulls rejected by each worker fall onto the conveyor at a point closely adjacent the indicia 16 corresponding to the station at which the cull rejection was made. As a result the inspector, at the inspection zone 15, can readily and visually ascertain if usable fruit or vegetables are being rejected as culls, and if so by which worker.

The gates 8 of the hoppers 7 are all automatically and simultaneously tripped or opened at the proper moment, and for the above purpose, by means of the following mechanism, which is actuated from the conveyor drive.

Adjacent the end thereof nearest the motor driven end of the conveyor 12, the rock shaft 9 is fitted with a radial, outwardly projecting lever 17, and the latter pivotally connects, at its outer end, to the upper end of a dependent link 18. At its lower end the link 18 pivotally connects to a bellcrank lever 19, pivoted, as at 20, in connection with the frame. At the end opposite the link 18 the bellcrank lever 19 is pivotally connected, as at 21, to one end of a longitudinal connecting rod 22. From the bellcrank lever 19 the connecting rod 22 extends lengthwise alongside the conveyor 12 in the direction of the motor driven end of the latter. Adjacent but short of said end the connecting rod 22 is coupled, in the manner hereinafter described, with a clutch unit, indicated generally at 23. The clutch unit 23 comprises a clutch plate 24 having a hub 25 journaled in connection with the frame 3; such hub at the end opposite the clutch plate 24 including a sprocket 26. The sprocket 26 is driven by an endless chain 27 from the adjacent end shaft 28 of said conveyor 12; such end shaft 28 being the one which is driven from the motor 13 by the drive 14.

A spindle 29 is turnably mounted in the hub 25, and a radial arm 30 is fixed on said spindle in cooperative relation to the clutch plate 24; such arm forming the second element of the clutch unit. The radial arm 30 is normally stationary; i. e. non-rotary with respect to the normally driven clutch plate 24.

Figure 3:
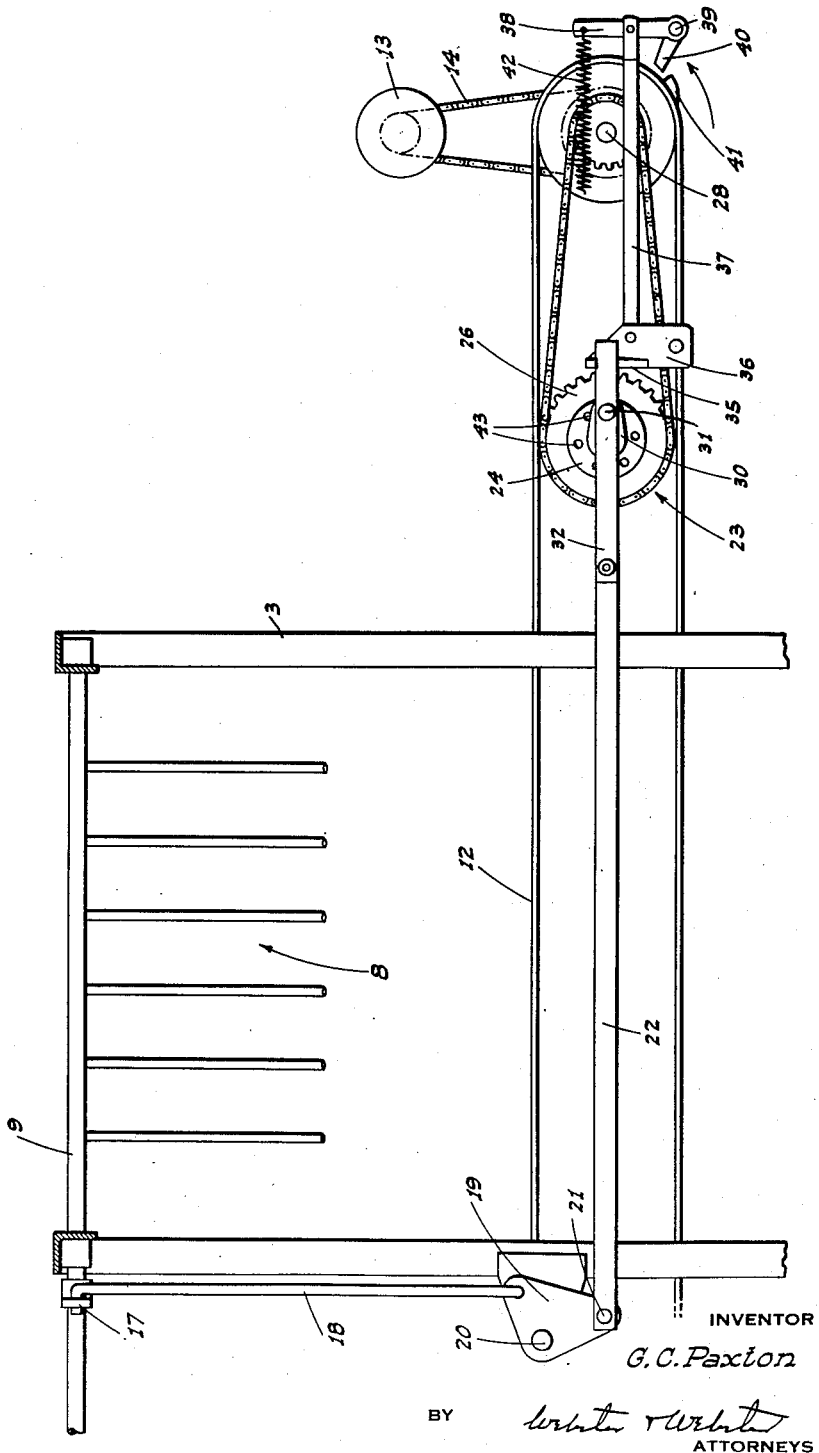
Fig. 3 is an enlarged fragmentary elevation of one of the hopper gates and the mechanism which automatically trips such gate, together with the others of the stand, in predetermined timed relation to travel of the cull conveyor; the gate being shown closed, and said mechanism being in its inactive position.
Figure 4:
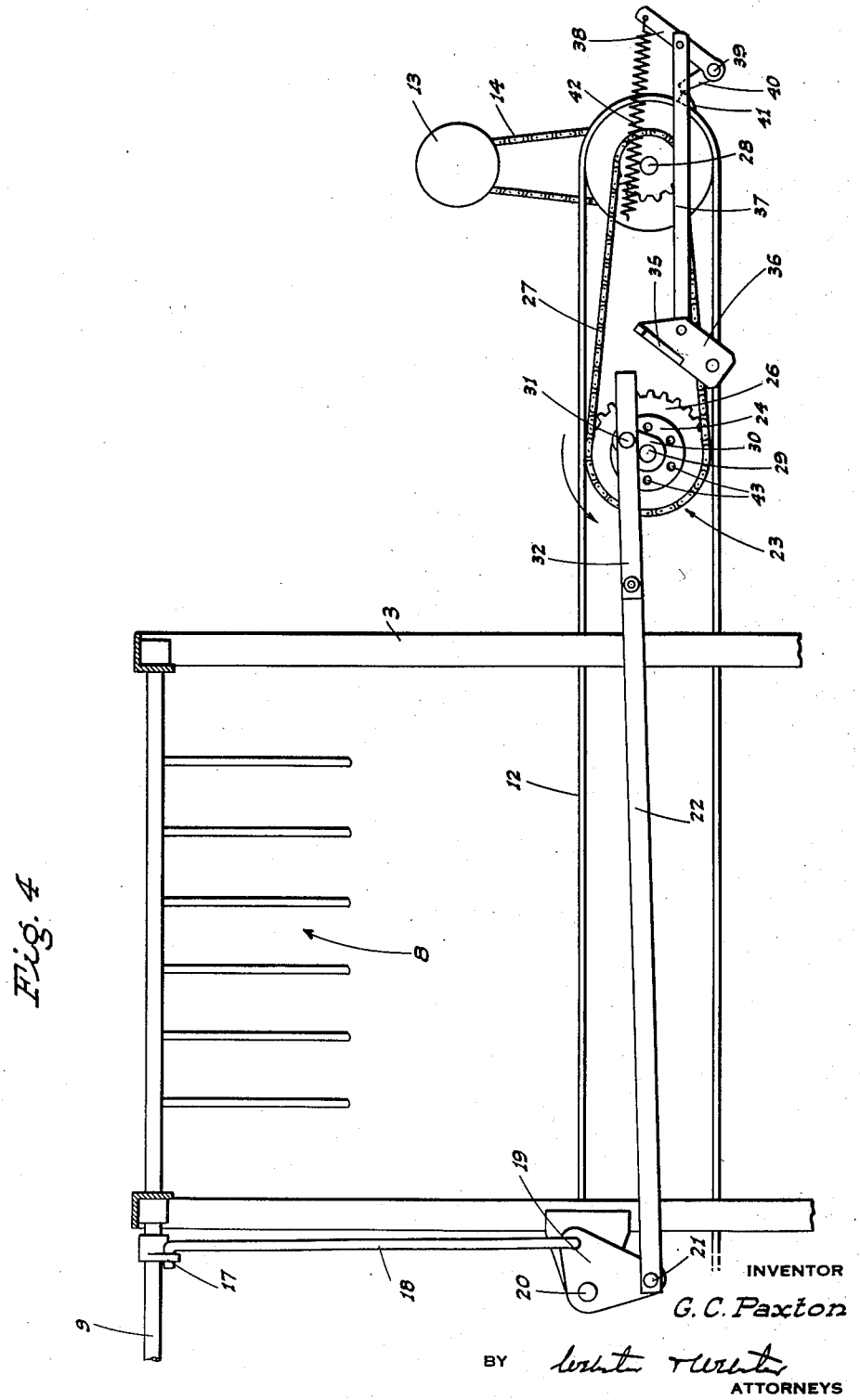
Fig. 4 is a similar view, but shows the gate release mechanism in operation.

A pin 31 extends, in slidable relation, through the adjacent end of the connecting rod 22 and radial arm 30, securing these two parts together. However, the pin 31 is normally free or retracted from the clutch plate 24; this being accomplished by means of a longitudinal leaf spring 32 secured at one end to the connecting rod 22 by a tension device 33; the leaf spring 32 extending in the direction of, and to a point beyond, the pin 31. The pin 31 is secured to the leaf spring 32, intermediate the ends of the latter, by a universal connection 34. Beyond the universal connection 34 the leaf spring 32 is normally engaged from the back side by a bevel cam 35 which urges said leaf spring 32 outwardly, holding the pin 31 retracted with respect to the clutch plate 24. The bevel cam 35 is formed on a swingable mounting plate 36 adapted to be swung from a position with the cam 35 in the path of the leaf spring 32, as in Figs. 3 and 5, to an inoperative position out of said path, as in Figs. 4 and 6.

The swingable mounting plate 36 is coupled by a pivoted longitudinal link 37 to an upstanding radial lever 38 fixed on a cross shaft 39 beyond the driven end of the conveyor 12; such cross shaft including a radial finger 40 projecting to a termination close to the belt of the conveyor 12.

Such belt carries a dog or trigger element 41 positioned to engage the radial finger 40, and to swing such finger so as to accomplish longitudinal shifting of the link 37, and swinging of the mounting plate 36, in a direction to place the bevel cam 35 in its inactive or out-of-operation position. This action is against the tension of a spring 42 connected to the lever 38 to normally maintain the mounting plate 36 with the bevel cam 35 in its working position.

It will thus be recognized that each time the dog 41 engages and actuates the radial finger 40, the bevel cam 35 will be shifted away from the leaf spring 32. When this occurs such spring urges the pin 31 inwardly, whence it immediately engages in one of a row of circumferentially spaced sockets 43 in the clutch plate 24. This couples the radial arm 30 to said clutch plate 24, whereupon the clutch unit 23 is operative, and the pin 31 rotates with said unit a full turn, acting as a crank pin with respect to the connecting rod 22, causing a single reciprocation of the latter. Such reciprocation of the connecting rod 22 is converted by the bellcrank lever 19, link 18, and radial lever 17 into a rocking motion of the shaft 28, which first simultaneously opens all of the gates 8, and then closes the same. When such gates open, the culls from the hoppers 7 discharge onto the conveyor 12 adjacent the indicia 16 in the manner, and for the purpose, previously described.

After one full revolution of the clutch unit 23, the pin 31 is automatically retracted from the clutch plate 24, whereby to disengage the clutch unit 23. This occurs for the reason that the dog 41 has escaped the finger 40, permitting the spring 42 to return the mounting plate 36 and bevel cam 35 to working position. Consequently, after the full revolution of the clutch unit 23 as above, the leaf spring 32 rides onto the bevel cam 35, retracting the pin 31 and disengaging said clutch unit.

With a clutch unit as above, the requisite predetermined timing between travel of the indicia-bearing conveyor 12, and opening of all of the gates 8 simultaneously, is accomplished accurately and effectively; it not being possible for the operations to lag relative to each other, and which would result in discharge of the culls onto the conveyor at an improper point with respect to the indicia 16.

The described cull checking system is relatively simple, but quite practical and reliable for the purpose of careful observation of the culls being rejected at each of the stations of a fruit or vegetable grading or packing stand.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In combination with a multiple station fruit or vegetable grading or packing stand which includes an endless conveyor common to said stations, a hopper adjacent each station in position to feed to the conveyor, a normally closed gate in cooperation with each hopper, exposed station-identifying indicia on the conveyor corresponding to each station, and means arranged to open the hopper gate at each station only when the corresponding indicium is adjacent on the conveyor; the stations being spaced lengthwise of the conveyor, the indicia being correspondingly spaced on the conveyor, and said means being operative to open all of the gates simultaneously.

2. A structure, as in claim 1, in which said means includes a normally disengaged clutch unit, a trigger element on the conveyor, and mechanism engaged by said trigger element operative to cause engagement of the clutch unit.

3. A structure, as in claim 2, in which said mechanism is arranged to automatically disengage the clutch unit after disengagement of the trigger element followed by predetermined rotary motion of said clutch unit.

4. In combination with a multiple station fruit or vegetable grading or packing stand which includes an endless conveyor common to said stations, a hopper adjacent each station in position to feed to the conveyor, a normally closed gate in cooperation with each hopper, exposed station-identifying indicia on the conveyor corresponding to each station, and means arranged to open the hopper gate at each station only when the corresponding indicium is adjacent on the conveyor; the length of the upper run of the conveyor being in excess of the distance between the endmost stations and the corresponding indicia, and such excess being mainly disposed beyond one endmost station in the direction of travel of the conveyor and freely exposed to provide an inspection area on the conveyor clear of the row of stations.

5. In combination with a multiple station fruit or vegetable grading or packing stand which includes an endless conveyor common to said stations, a hopper adjacent each station in position to feed to the conveyor, a normally closed gate in cooperation with each hopper, common control means operative to open the gates simultaneously, the stations being spaced lengthwise of the conveyor, indicia on the conveyor corresponding to and spaced the same as said stations, and means responsive to travel of the conveyor operative to actuate said control means to cause simultaneous opening of the gates when the indicia are adjacent corresponding stations.

6. In combination with a multiple station fruit or vegetable grading or packing stand which includes an endless conveyor common to said stations, a hopper adjacent each station in position to feed to the conveyor, a normally closed gate in cooperation with each hopper, common control means operative to open the gates simultaneously, the stations being spaced lengthwise of the conveyor, indicia on the conveyor corresponding to and spaced the same as said stations, and means responsive to travel of the conveyor operative to actuate said control means to cause simultaneous opening of the gates when the indicia are adjacent corresponding stations; said control means including a normally disengaged clutch unit, and said last named means including a trigger element on the conveyor and a separate cooperating part whose engagement and movement by said trigger element causes engagement of the clutch unit.

7. A structure, as in claim 6, in which the clutch unit is automatically disengaged after separation of said element and part, and subsequent predetermined rotation of said clutch unit.

8. In combination with a multiple station fruit or vegetable grading or packing stand which includes an endless conveyor common to said stations, a hopper adjacent each station in position to feed to the conveyor, a normally closed gate in cooperation with each hopper, common control means operative to open the gates simultaneously, the stations being spaced lengthwise of the conveyor, indicia on the conveyor corresponding to and spaced the same as said stations, and mechanism including a clutch unit operative to actuate said control means to simultaneously open the gates when the indicia are adjacent corresponding stations.

9. In combination with a multiple station fruit or vegetable grading or packing stand which includes an endless conveyor common to said stations, a hopper adjacent each station in position to feed to the conveyor, a normally closed gate in cooperation with each hopper, common control means operative to open the gates simultaneously, the stations being spaced lengthwise of the conveyor, indicia on the conveyor corresponding to and spaced the same as said stations, and mechanism including a clutch unit operative to actuate said control means to simultaneously open the gates when the indicia are adjacent corresponding stations, and to then close said gates.

10. In combination with a multiple station fruit or vegetable grading or packing stand which includes an endless conveyor common to said stations, a hopper adjacent each station in position to feed to the conveyor, a normally closed gate in cooperation with each hopper, common control means operative to open the gates simultaneously, the stations being spaced lengthwise of the conveyor, indicia on the conveyor corresponding to and spaced the same as said stations, and mechanism including a clutch unit operative to actuate said control means to simultaneously open the gates when the indicia are adjacent corresponding stations, and to then close said gates; said mechanism including a member movable to cause engagement of the clutch unit, and a trigger element on the conveyor in position to engage and move said member.

11. In combination with a multiple station fruit or vegetable grading or packing stand which includes an endless conveyor common to said stations, a hopper adjacent each station in position to feed to the conveyor, a normally closed gate in cooperation with each hopper, common control means operative to open the gates simultaneously, the stations being spaced lengthwise of the conveyor, indicia on the conveyor corresponding to and spaced the same as said stations, and mechanism including a clutch unit operative to actuate said control means to simultaneously open the gates when the indicia are adjacent corresponding stations, and to then close said gates; said mechanism including a member movable to cause engagement of the clutch unit, and a trigger element on the conveyor in position to engage and move said member, said member being spring reset to a clutch-disengaging position upon separation of the trigger element from the member.

12. In combination with a multiple station fruit or vegetable grading or packing stand which includes an endless conveyor common to said stations, a hopper adjacent each station in position to feed to the conveyor, a normally closed gate in cooperation with each hopper, common control means operative to open the gates simultaneously, the stations being spaced lengthwise of the conveyor, indicia on the conveyor corresponding to and spaced the same as said stations, and mechanism including a clutch unit operative to actuate said control means to simultaneously open the gates when the indicia are adjacent corresponding stations; said control means including a longitudinal connecting rod adapted to reciprocate to open and then close the gates, and said clutch unit including a normally stationary clutch part to which the connecting rod is secured in crank relation.

13. A structure, as in claim 12, in which the clutch parts are adapted to be engaged by a slidable, transverse pin; the latter being the crank pin for the connecting rod, and means responsive to travel of the conveyor arranged to slide said pin in one direction to engage the clutch unit.

14. In combination with a multiple station fruit or vegetable grading or packing stand which includes an elongated upstanding frame, a plurality of grading or packing stations along the frame, each station including a hopper, an endless conveyor in the frame in cooperating relation below the hoppers, a normally closed gate for each hopper, indicia on the conveyor corresponding to and spaced the same as the stations, and mechanism supported by the frame and connected to the gates to simultaneously open the same only when corresponding indicia are adjacent said stations.

15. In combination with a multiple station fruit or vegetable grading or packing stand which includes an elongated upstanding frame, a plurality of grading or packing stations along the frame, each station including a hopper, an endless conveyor in the frame in cooperating relation below the hoppers, a normally closed gate for each hopper, indicia on the conveyor corresponding to and spaced the same as the stations, and mechanism supported by the frame and connected to the gates to simultaneously open the same when corresponding indicia are adjacent said stations; said mechanism including a longitudinal rock shaft connected to the gates, and a normally disengaged clutch unit having a conveyor-driven member and a rock shaft actuating member, and means responsive to travel of the conveyor adapted to engage the clutch unit.

16. A structure, as in claim 15, in which said last named means includes a trigger element on the conveyor, and instrumentalities placed in operation by engagement and movement by said trigger element.

17. A hopper discharge checking system for a stand having multiple stations at which workers place selected material in the corresponding hopper, normally closed gates for the hoppers, an endless receiving conveyor common to said hoppers, mechanism to open the gates, and means operative to identify the hopper from which material on the conveyor was received; said mechanism being arranged to open the gates simultaneously at a predetermined time relative to conveyor travel, and said last named means being indicia on the conveyor corresponding to and spaced substantially the same as said stations.

18. A system as in claim 17, in which the indicia are in the form of relatively large station-identifying symbols on the exposed face of the conveyor and arranged, when the gates are opened, so as to be just to one side of the areas on the conveyor which receive the material from the corresponding hoppers.

GERALD C. PAXTON.

References Cited in the file of this patent

UNITED STATES PATENTS

| Number | Name | Date |
|--------|------|------|
| 825,667 | Latchford | July 10, 1906 |
| 958,230 | Cowley et al. | May 17, 1910 |
| 1,026,755 | Lundin | May 21, 1912 |
| 1,388,065 | Schmitz | Aug. 16, 1921 |
| 1,439,825 | Kuhn et al. | Dec. 26, 1922 |
| 1,545,400 | Comstock | July 7, 1925 |
| 2,105,266 | Rendall | Jan. 11, 1938 |
| 2,269,827 | Mendoza | Jan. 13, 1942 |
| 2,315,659 | Russell | Apr. 6, 1943 |